US005770289A

United States Patent [19]

Tracy

[11] Patent Number: 5,770,289

[45] Date of Patent: Jun. 23, 1998

[54] DIE CUT SELF-ADHESIVE LABEL SHEET FOR LABELING CD-ROMS

[76] Inventor: Peter Tracy, 170 Barkder Hill Rd., Guilford, Conn. 06437

[21] Appl. No.: 748,430

[22] Filed: Nov. 13, 1996

[51] Int. Cl.$^{6}$ .......................................................... B32B 3/02

[52] U.S. Cl. .......................... 428/40.1; 283/81; 428/40.9; 428/41.1; 428/41.2; 428/42.1; 428/42.2; 428/42.3; 428/66.6; 428/66.7

[58] Field of Search ................................ 428/40.1, 40.9, 428/41.1, 41.2, 42.1, 42.2, 42.3, 66.6, 66.7, 65.2, 64.1; 283/81

[56] References Cited

U.S. PATENT DOCUMENTS 4,696,706 9/1987 Griffin .................................... 428/42.1

4,983,437 1/1991 Merrick .................................. 428/42.1

FOREIGN PATENT DOCUMENTS 32251 12/1955 Germany .............................. 428/42.2

2084077 4/1982 United Kingdom .................. 428/42.3

*Primary Examiner*—Naser Ahmad

*Attorney, Agent, or Firm*—Steven M. Hoffberg; Milde, Hoffberg & Macklin, LLP

[57] ABSTRACT

A die cut self adhesive label sheet, comprising at least three circular CD-ROM labels arranged on a letter or A4 size sheet. The sheet preferably has about a 5 mm margin on each side, with CD-ROM label diameters of about 115 mm (letter size) and 112–113 mm (A4 size). A plurality of additional labels may be formed in the interstices.

11 Claims, 2 Drawing Sheets

DIE CUT SELF-ADHESIVE LABEL SHEET FOR LABELING CD-ROMS

FIELD OF THE INVENTION

The present invention relates to the field of self-adhesive labels for CD-ROMS, and more particularly, the invention relates to an a die cut sheet having a plurality of labels formed thereon.

BACKGROUND OF THE INVENTION

The proliferation of compact disks (discs), also known as laser disks, in the form of music as well as CD-ROM products has become extensive. In recent years, recordable compact disks such as those produced by SONY, 3M, and KODAK have grown in popularity. Further, these disks are being used for archival data storage, immediate distribution of data, and for demonstration purposes.

With this recent use has grown a need to label these disks once they have been produced. This is because once produced, there is no apparent visual method for determining the contents of a disk, which may contain 680 MB of data or more. While manufacturers of large numbers of identical disks have their labels or identifying information painted, silkscreened or printed onto the disks, e.g., a layer of adherent ink or pigment is applied to the surface of the disk, this method is impractical for recordable compact disk producers. For small runs or those requiring immediate availability of the disk, printing or painting based methods of labeling take too much time, incur a significant setup charge, and require special equipment.

Another known method of labeling a compact disk employs a direct printing using an ink jet system onto the surface of a disk. These systems provide a special carrier for the disk, which is printed using a conventional ink jet printing apparatus. This method suffers the shortcomings of ink jet technology, including problems with the inks used, such as smudging, running, lack of scratch resistance on the disk surface, and the like.

Ink markers may also be used to label disks, but this is unattractive and can cause damage to the disk by breaking down the coating which protects the disk. Permanent ink markers often include solvents in the ink.

As a result, manufacturers such as Avery Dennison, Avery Division, Diamond Bar Calif., have begun producing self-adhesive labels shaped like and designed for compact disks.

The assignee of the present invention has developed a compact disk labeling device known as the "Neat-O", which easily positions a self adhesive label with respect to a compact disk or recordable compact disk before allowing contact therewith. Thus, the prior art methods of marking the disks with felt tip markers, manually positioning rectangular or circular labels on the disk, and printing directly on the disks with an ink jet printer are obviated.

Typically, labels were printed one at a time through a printer, with a later design allowing "two up" printing of two compact disk labels aligned and centered on a single sheet. However, these labels either did not employ standard letter or "A4" size paper, or wasted a large portion of the sheet.

SUMMARY AND OBJECTS OF THE INVENTION

It is therefore an object of the invention to provide a die cut self-adhesive label layout with a minimum of waste and three CD-ROM labels on a single sheet.

It is a further object of the present invention to provide a letter size sheet having three CD-ROM die cut adhesive labels, wherein the edges of the label are within a printable region of a standard letter size sheet, i.e., at least 0.25" margins.

It is a still further object of the invention to provide a letter size sheet having three CD-ROM die cut adhesive labels, wherein the sheet further includes accessory labels for labeling CD-ROM packaging.

According the present invention, three CD-ROM labels are provided in a triangular pattern with a middle label offset from a centerline of the other two labels. In the other regions of the sheet, three generally rectangular labels, which a spaced between the outer edges of the circular labels, may be provided as die cut blanks, for labeling of CD-ROM jewel cases and the like.

The CD-ROM labels are each about 115 mm in diameter with a central aperture with a diameter of about 41 mm. According to the present design, the external diameter is limited by the size of the sheet, with letter size sheet yielding a slightly larger diameter label than an A4 size sheet. For example, rectangular labels of about 70 mm×50 mm (2 each), and 80 mm×25 mm (1 each) may be provided on a letter size sheet. The inner diameter of the label is preferably 41 mm, which corresponds to a diameter suitable for use with the "Neat-O", available from the assignee hereof.

Advantageously, the preferred letter size sheet is symmetric about the middle axis, i.e., the axis parallel to the 8" side of the sheet 5.5" from the edge.

It is therefore an object of the invention to provide a die cut self adhesive label sheet, comprising at least three circular CD-ROM labels arranged on a sheet having dimensions of between about 210–220 mm by about 275–300 mm. These dimensions preferably correspond to letter size sheet and A4 size sheet. The preferred label has an external diameter of about 115 mm for letter size and 112 mm for A4 size, and more preferably the sheet is letter size with three 115 mm diameter labels.

It is another object according to the present invention to provide a label sheet having an external margin of at least about 5 mm around each CD-ROM label, to allow printing of the entire label area while allowing for a printer paper feed mechanism.

It is a still further object according to the present invention to provide a label sheet having CD-ROM labels with an inner diameter of about 41 mm, which clears a hub area of a CD-ROM while providing a large printable area.

It is another object according to the present invention to provide a label sheet according having three CD-ROM labels and a plurality of further die cut labels outside said CD-ROM labels. The further labels are preferably substantially rectangular.

The label sheet may be formed of a stock having an aluminum layer or a pigmented layer over at least the die cut portions. A preferred weight of the stock is about 80 pound.

These and other objects and features of the present invention will become more fully apparent from the following description and appended claims taken in conjunction with the accompanying drawings, in which like numerals refer to like parts.

BRIEF DESCRIPTION OF THE DRAWING

The FIG. 1 shows a top view of a layout of a die cut sheet having three CD-ROM labels and three rectangular labels laid out on a letter size sheet, according to the present invention.

DETAILED DESCRIPTION OF THE PREFERRED EMBODIMENTS

Figure 1:
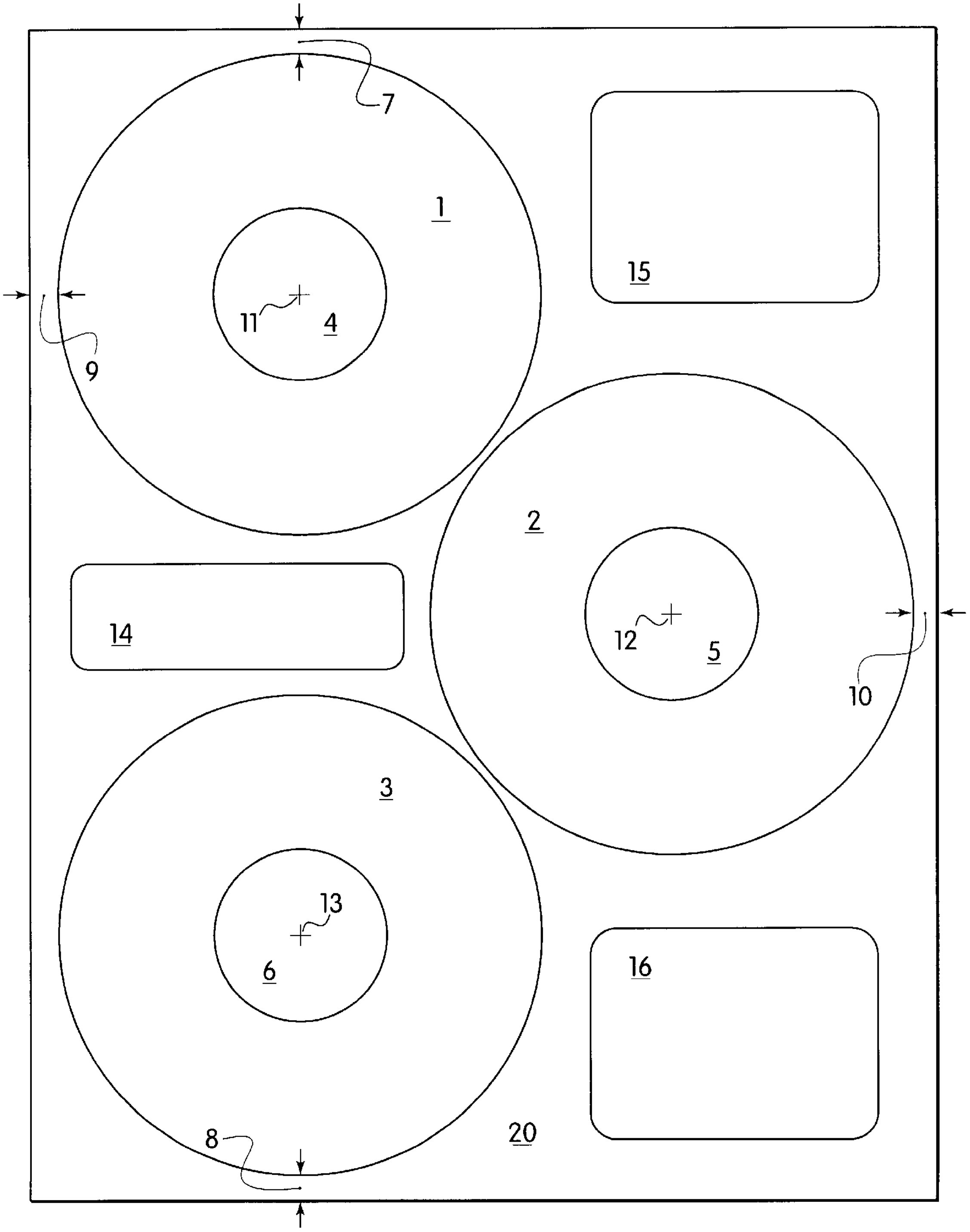
Figure 2:
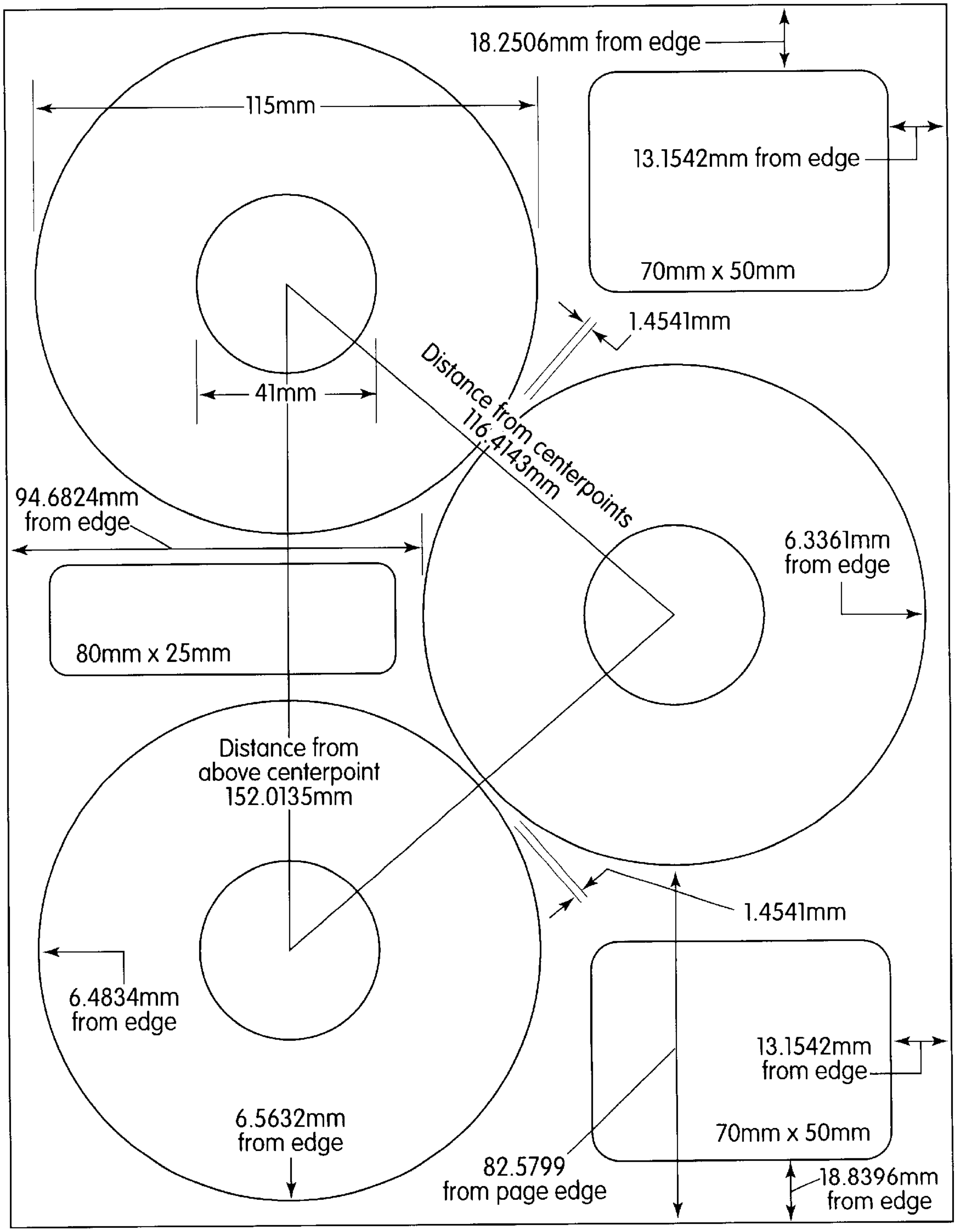
FIG. 2 shows a layout of the die cut sheet including preferred dimensions.

The invention will now be described by way of the drawing, in which corresponding reference numerals indicate corresponding structures in the figure.

The figure shows a preferred layout of the die cut CD-ROM labels 1, 2, 3 according to the present invention. Three CD-ROM labels 1, 2, 3 are laid out, each being 115 mm in diameter with a central aperture 4, 5, 6 of 41 mm diameter. The top 7 and bottom 8 margins are about 5.8–6.6 mm, with the left 9 and right 10 margins being about 6.3–6.5 mm. The centers 11, 13 of the two CD-ROM labels 1, 3 on the left side are separated by about 152.0 mm, while the distance between the centers 11, 13 of the two left side labels 1, 3 and the center 12 of the right side label 2 is about 116.4 mm, centered between the two labels 1, 3 and offset to the right. The edges of the labels of the upper label 1 and middle label 2 and lower label 3 and middle label 2 are separated by about 1.5 mm.

Provided in the gap between the upper label 1 and lower CD-ROM label 3 on the left side is a rectangular label 14 having dimensions of about 80 mm×25 mm, with a corner radius of about 5 mm. Above and below the middle CD-ROM label 2 are provided two rectangular labels 15, 16 having dimensions of about 70 mm×50 mm, as shown in the figure. These larger labels 15, 16 have a corner radius of about 7 mm.

The label sheet 20 may be formed of white stock, preferably heavy enough to prevent show-through of any markings on the CD-ROM, or colored stock, which may be colored entirely or to a position just outside the die cut margins. The label stock 20 may also be an aluminized foil stock. Preferably, the stock is 80 pound or greater.

Where the label stock is A4 size, i.e., 210×297 mm, rather than letter size, which is 279.4×216 mm, the preferred size of the CD-ROM labels is preferably slightly smaller in diameter, i.e., about 112–113 mm, which allows a small margin on the sheet for paper handling in a printer.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A die cut self adhesive CD-ROM label sheet, comprising at least three circular labels arranged on a sheet having dimensions of between about 210–216 mm by about 297–279.4 mm, said labels each being adapted for adhering to a CD-ROM, wherein said label sheet is formed of a stock having a first color and having a pigment of a second color applied over a portion of said sheet encompassing said at least three circular labels, wherein said first color and said second colorare different.

2. The label sheet according to claim 1, wherein said sheet has a margin of at least about 5 mm around each CD-ROM label.

3. The label sheet according to claim 1, wherein said CD-ROM labels have a diameter of about 115 mm.

4. The label sheet according to claim 1, wherein said CD-ROM labels have an inner diameter of about 41 mm.

5. The label sheet according to claim 1, wherein said sheet has a plurality of further die cut labels outside said CD-ROM labels.

6. The label sheet according to claim 5, wherein at least one of said further die cut labels is generally rectangular.

7. The label sheet according to claim 1, wherein said label sheet is formed of at least 80 pound stock.

8. The label sheet according to claim 1, wherein said label sheet is formed of white stock having a pigment applied over a portion of said sheet encompassing said at least three circular labels.

9. The label sheet according to claim 1, wherein said label sheet is formed of a stock having an aluminum layer.

10. The label sheet according to claim 1, wherein said label sheet is letter size, and said CD-ROM labels have a diameter of about 115 mm.

11. The label sheet according to claim 1, wherein said label sheet is A4 size, and said CD-ROM labels have a diameter of about 112 mm.

* * * * *